United States Patent [19]
Lander

[11] 4,444,148
[45] Apr. 24, 1984

[54] WASTE RECEPTACLES HAVING ODOR BARRIERS

[75] Inventor: Harry L. Lander, Grand Rapids, Mich.

[73] Assignee: Cattus Limited, Midland, Tex.

[21] Appl. No.: 295,740

[22] Filed: Aug. 24, 1981

[51] Int. Cl.³ .................................. A01K 1/015
[52] U.S. Cl. .......................... 119/1; 4/300.3
[58] Field of Search .................. 119/1; 4/300.3

[56] References Cited

U.S. PATENT DOCUMENTS

| | | | |
|---|---|---|---|
| 3,332,397 | 7/1967 | VanderWall | 119/1 |
| 3,965,863 | 6/1976 | Scott | 119/1 |
| 4,038,944 | 8/1977 | Tucci | 119/1 |
| 4,326,481 | 4/1982 | Gruss | 119/1 |

Primary Examiner—Hugh R. Chamblee

[57] ABSTRACT

Waste receptacles for use by animals, such as laboratory animals and household pets, are provided with an odor barrier of lightweight, non-absorbent, non-water-wettable, granular material, such as paraffin wax coated corn cob granules. The buoyant, non-absorbent, lightweight granular material is also useful as an odor barrier in liquid-containing portable human toilets and generally as an odor barrier for pools or sumps or open containers of odoriferous materials, such as aqueous offal wastes, aqueous waste from food processing plants and odoriferous wastes from other sources, such as industial sources, e.g., paper mills, chemical plants, manufacturing plants and the like. The non-absorbent granular material in animal toilet applications is conveniently retained on a foraminous tray which, in turn, is mounted on a collecting tray for collection of liquid waste percolating downwardly from the granular material into which the liquid waste was originally deposited.

23 Claims, 6 Drawing Figures

WASTE RECEPTACLES HAVING ODOR BARRIERS

BACKGROUND OF THE INVENTION

The present invention relates to waste receptacles having an odor barrier, and more particularly to waste receivers for small animals and also to portable toilets for human use. The present invention also relates to materials which can be used to form an odor barrier to cover odoriferous liquid materials.

Waste receptacles and toilets for small animals, such as laboratory animals and household pets, generally employ absorbent material, such as shredded paper, sawdust, sand, ash, clays, and mineral aggregates, among others, in a container for receiving such animals' liquid excrement or waste. In particular, the absorbent material takes up the animals' liquid urine product or output. The absorbent material in time becomes a source of offensive urine odor. Attempts have been made to minimize the offensive odor. Generally, such attempts have been directed at the incorporation of fragrances and deodorants in the absorbent material, as described in U.S. Pat. No. 3,921,581. Such attempts have been only marginally successful in that as more urine is absorbed by the absorbent material and remains there, the incorporated fragrance or deodorant becomes less effective. Whether the absorbent material is treated with fragrance or deodorant or not, offensive urine odor can usually only be effectively controlled in present animal toilets by replacement of absorbent material once wetted by the animal. Such replacement is, however, necessary and/or costly in that the absorbent is not used effectively. Additionally, the urine wetted absorbent material, particularly inorganic material, is heavy and handling of such is difficult and cumbersome and present a site or substrate for bacterial growth and contamination which might endanger the well being of the animals in contact therewith and give rise to other undesirable odors.

The present invention in one aspect is directed to providing a waste receptacle for animals which will not be the source of or give rise to or present an odor, such as an offensive urine odor. The present invention in another aspect also is directed at materials which will function or serve as odor barriers, such as for use in animal toilets and portable human toilets or as a top coating or cover for odoriferous waste materials in pools, ponds, collecting sumps, open containers and the like.

BRIEF SUMMARY OF THE INVENTION

In accordance with the present invention, it has been determined that offensive odors from waste receptacles, such as household pet toilets, portable human toilets, and pools of odoriferous wastes can be controlled and eliminated by use of odor barriers of hydrophobic, non-water-wettable or non-absorbent, granular or particulate material. In applications for animal toilets, the odor barrier comprises a lightweight or buoyant non-absorbent granular material forming a layer over and covering the liquid waste material giving rise to the objectionable odor and a foraminous tray supporting the layer of granular material and positioned above the odoriferous material.

The foraminous tray with layer of non-absorbent granular material covers, and may be supported by, a liquid waste collecting tray. The non-absorbent granular material allows passage of odoriferous urine product therethrough to the collecting tray while entrapping odors therein. The collecting tray may be fitted with a drain opening to an external waste line to facilitate continuouse disposal of urine product or washings. In applications for portable human toilets, buoyant, non-absorbent granular material is employed in conventional water-containing receptacles, such as plastic pouches, used in such portable toilets. The buoyant, non-absorbent granular material floats on and forms a layer over the water, allowing passage of liquid and solid excrement into the water. Odors are accordingly entrapped.

DETAILED DESCRIPTION OF PREFERRED EMBODIMENTS

Figure 1:
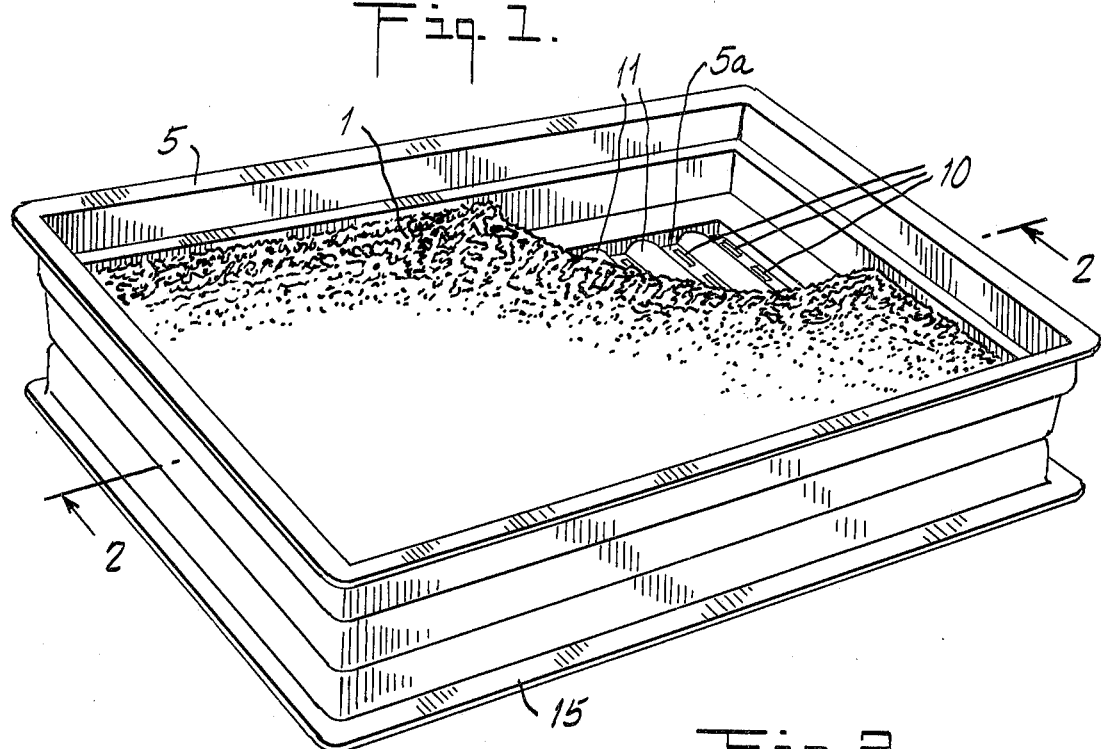
FIG. 1 is a perspective view of a waste receiver or toilet for a household pet, such as a cat, in accordance with this invention.

The waste receptacle or toilet for small animals of the present invention comprises a layer of non-absorbent or hydrophobic granular material placed on and covering a foraminous or sieve-like tray which tray is then mounted on or over and covers a collecting tray. The non-absorbent granular material is of sufficient size so as to be supported by the sieve-like tray and not pass through the openings in such tray. Animals' liquid urine product passes through the layer of non-absorbent granular material and also through the openings in the foraminous tray into the collecting tray. The layer of non-absorbent granular material acts as an odor barrier, especially so when the foraminous tray is directly fitted to and carried on the collecting tray. Although any granule size of non-absorbent material may be used, large granule size requires that the non-absorbent material be placed in a thick layer to function as an odor barrier because the voids between granules of such material are large. It has been found that for a layer thickness of non-absorbent granular material of about 1.0–2.0 inches, such as about 1.25 inches to about 1.75 inches, the granules should be about 0.06–0.4 inch, such as about 0.12 inch to about 0.25 inch in diameter.

Solid waste is conveniently periodically removed from the non-absorbent, granular material layer, e.g., by scooping. Additionally, to insure utmost freshness, the non-absorbent granular material can be periodically cleansed by flushing with water. The non-absorbent granular material need not be disposed of, even after prolonged use.

Absorbent material, such as shredded paper or any of the other usual litter materials for animal toilets, can be used or placed in the collecting tray as an absorbent for the liquid waste. Additionally, the collecting tray can be fitted with a drain connection, such as for continuous disposal of liquid waste into an external waste line.

The small animal toilet of the invention can be readily adapted for use in conjunction with animal cages, such as those used for laboratory animals such as rats, mice, and rabbits. The cages generally have a floor of solid material with wire mesh or strips forming walls about and containing the animal. A bed of absorbent litter is generally placed on the floor of the cage. To clean the cage, the bed of soiled litter must be removed, disposed of and replaced, which is cumbersome. Using the small animal toilet aspect of this invention, the foraminous tray forms the floor of the cage, and wire mesh or strips are attached to the perimeter of the tray to form walls to contain the animal. A layer of non-absorbent granular material is placed on and supported by the foraminous tray so as to cover the tray. The so-constructed tray is mounted on a collecting tray, which is preferably fitted with a drain attached to an external waste line. Accordingly, liquid urine product passes through the layer of non-absorbent granular material and the openings in the foraminous tray into the collecting tray, and preferably eventually through the drain to the external waste line. Solid waste is removed from the cage periodically, e.g., by scooping. The non-absorbent granular material in the so-constructed cage can be refreshed and cleansed of debris in sites, if desired or necessary, by flushing with water.

It has been found that hydrophobic granular material forming an odor barrier has application also in portable human toilets and in commercial or industrial or municipal waste disposal pools or installations, including cesspools. Portable human toilets are generally employed when sewer systems are not accessible, for example, at constructions sites, in small marine boats, and with camping equipment. Usually such portable toilets are pail-type receptacles or have disposable plastic pouches employing disinfectants, and in some cases odor-masking chemicals, with water. The most negative aspect of such human waste receptacles is the obnoxious odors produced by them. Such odors can be substantially reduced with the use of a layer of low density, buoyant, hydrophobic granular material. Solid and liquid excrement passes through the granular layer and becomes covered and entrapped below the layer by virtue of its higher specific gravity. Furthermore, in addition to odor control, as the layer of buoyant, hydrophobic granular material would likely be opaque, the portable toilet according to this invention is esthetically less offensive than prior portable toilets.

Non-absorbent or hydrophobic granular material can be prepared from absorbent materials, such as sand, mineral aggregates, clay, sawdust and other materials, by coating such material with a film of hydrophobic materials, such as paint, plastic, wax, silicone oils and polymers, pitch, asphalts, tar, among others. Materials in granular form that are naturally non-absorbent and/or hydrophobic can also be used to form the odor barrier layer, e.g., thermoplastics in hollow or solid or bead form, among others. Where weight of the granular layer is a consideration, preferred materials are lightweight mineral aggregates, such as perlite, vermiculite or granulated corn cobs, coated with a hydrophobic material, such as paraffin wax, or treated so as to be hydrophobic or non-water-wettable and substantially non-absorbent. Buoyant, hydrophobic granular materials are prepared from low density granular materials, i.e., those materials having a bulk density of less than water, such as less than about 45 pounds per cubic foot. The preferred materials are those having a bulk density of about 7–40 pounds per cubic foot, such as about 15 to about 30 pounds per cubic foot. Examples of such low density materials are wax-coated corn cob granules, wax-coated vermiculite, wax-coated perlite, wax-coated granulated bagasse, wax-coated granulated wood, comparable silcone treated or bitumen treated materials, among others. The preferred material is wax-coated corn cob granules because of its low cost, ready availability and to render the corn cob granules hydrophobic requires smaller amounts of wax than materials such as mineral aggregates. In addition to wax, coating materials such as paint and comparable hydrophobic film forming materials can also be used to render low-density granular material hydrophobic. However, as noted above, the bulk density of the hydrophobic granular material should desirably not exceed 45 pounds per cubic foot.

EXAMPLE 1

Non-absorbent granular material can be readily prepared from conventional cat litter and oil-based paint. In a tumbler, approximately 10 pounds of cat litter by Mid-Florida Mining Company are placed. While tumbling, about 5 pounds of oil-based RUSTOLEUM paint (manufactured by Rust-O-Oleum Corporation, Evanston, ILL.) is added. The mixture is tumbled until tack free. The mixture is then air-dried. The resulting dry, paint-coated cat litter granules have a density of approximately 52 pounds per cubic foot and are hydrophobic.

EXAMPLE 2

Non-absorbent granular material can be prepared from mineral aggregate, polyester resin and paraffin wax. Approximately 10 pounds of GRAVELITE mineral granules (manufactured by Florida Mining & Metals) are placed in a tumbler heated to about 80° C. to 100° C. While tumbling the aggregate, approximately 5 pounds of polyester/styrene liquid resin, which has been catalyzed by about 0.15 pound MEK peroxide, and about 0.04 pound of paraffin wax is charged into the tumbler. Tumbling is continued until the aggregate granules are tack free. The resulting resin and wax coated mineral aggregate has a density of about 60 pounds per cubic foot and is hydrophobic.

EXAMPLE 3

Non-absorbent granular material can be prepared from mineral aggregate and paraffin wax. Approximately 10 pounds of GRAVELITE mineral aggregate granules (manufactured by Florida Mining & Metals) are placed in a tumbler heated to about 85° C. To the tumbler is also added about 5 pounds of paraffin wax chips. The mixture is tumbled until the aggregate granules are uniformly coated with wax. When so coated, the mixture is transferred to a tumbler, at about 250° C. or lower, and the mixture is tumbled until the wax coating solidifies on the aggregate granules. The wax-coated granules have a density of approximately 50 pounds per cubic foot and are hydrophobic.

EXAMPLE 4

Non-absorbent granular material can be prepared from lightweight mineral aggregate, such as perlite, and paraffin wax. Approximately 2.5 pounds of PEARLITE perlite aggregate granules (manufactured by Air Lite Corporation, Vero Beach, Fla.) are placed in a tumbler heated to about 85° C. to 95° C. Also placed in the heated tumbler are about 3 pounds of paraffin wax chips. The mixture is tumbled until the perlite granules are uniformly coated with wax. When so coated, the mixture is transferred to a cool tumbler, about 25° C. or lower, and the mixture is tumbled until the wax coating solidifies on the perlite granules. The wax-coated perlite granules have a density of about 15 pounds per cubic foot and are hydrophobic.

EXAMPLE 5

Non-absorbent granular material can be prepared from granulated corn cobs and paraffin wax. Granulated corn cobs having a diameter between about 0.12 inch to about 0.25 inch and paraffin wax chips are placed in a tumbler heated to about 85° C. to 95° C. The mixture is tumbled until the corn cob granules are substantially uniformly coated, the mixture is transferred to a cool tumbler, about 25° C. or less, and tumbled until the wax coating solidifies on the corn cob granules. The wax-coated corn cob granules have a density of about 30 pounds per cubic foot and are hydrophobic. The corn cob granules may be pigmented before the initial tumbling, if so desired. Additionally, there is available from the Andersons, Cob Division, Maumee, Ohio, granulated corn cobs having a slow rate of absorption. The cob granules are marketed under the trademark BED-O'COBS. The BED-O'COBS granules preferably should be coated with a wax film or other hydrophobic material in accordance with this invention. In the preparation of the water-repellant granular materials, there may also be incorporated in the granular material before coating or included along with the water-repellant or hydrophobic coating material or separately a pesticidal and/or bactericidal and/or fungicidal material or agent.

Referring to the drawings, FIG. 1 shows a perspective plan view of one embodiment of a household pet waste receptacle or toilet according to the invention.

The toilet is comprised of a foraminous tray 5, having openings 10 in corrugated floor 5a. Additionally, to insure efficient drainage of liquid waste through openings 10, floor 5a of foraminous tray 5 is preferably adapted to have ridges or elevations or corrugations 11 adjacent openings 10 so that liquid waste will not collect in the areas surrounding openings 10. Spread throughout and forming a uniformly thick layer in foraminous tray 5 is hydrophobic granular material 1. Foraminous tray 5 is mounted on, covers, and is supported by collecting tray 15. Foraminous tray 5 and collecting tray 15 are preferably made of non-absorbent material, such as plastic. The size and shape of foraminous tray 5 and collecting tray 11, as well as the size of openings 10, will vary depending upon the size of animal using the toilet. For example, for a household cat foraminous tray 5 will be approximately 21 inches long and approximately 16 inches wide. Foraminous tray 5 for a cat will be about 3 inches deep, accommodating up to about 1.75 inch thick layer of hydrophobic granular material. Non-absorbent granular material 1 will be approximately 0.12 inch to approximately 0.25 inch in diameter for the cat toilet and will form a layer approximately 1.25 to about 1.75 inch thick. Openings 10 will be about 0.06 inch wide and 0.75 inch long.

Figure 2:
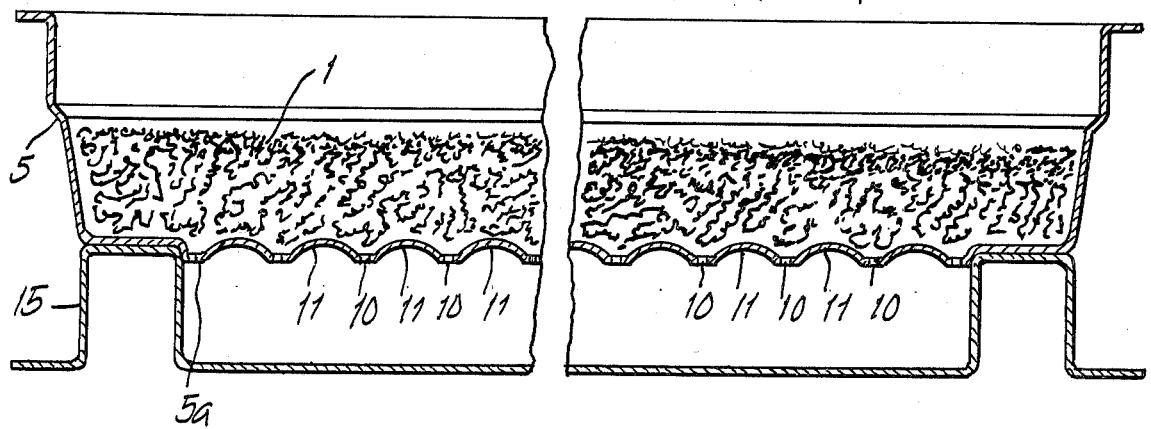
FIG. 2 is a sectional view of the household pet toilet of FIG. 1 through line 2—2 of FIG. 1.

FIG. 2 is a sectional view of the household pet toilet of FIG. 1 along line 2—2. Openings 10 in floor 5a of foraminous tray 5 are shown, together with preferred elevations or corrugations 11 to insure efficient drainage of liquid waste.

Figure 3:
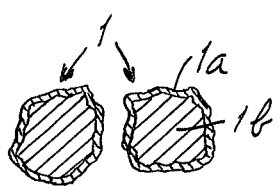
FIG. 3 is a sectional view of an example of granular, non-absorbent material useful for forming an odor barrier according to the invention.

FIG. 3 shows a sectional view of hydrophobic or non-absorbent granular material 1 that has been prepared in accordance with this invention by coating granular material. Accordingly, coating 1a is shown, which coating can be hydrophobic or substantially non-water-wettable or substantially non-water-absorbable paint, paraffin wax, polymer, among others. Granular material 1b is shown as well.

Figure 4:
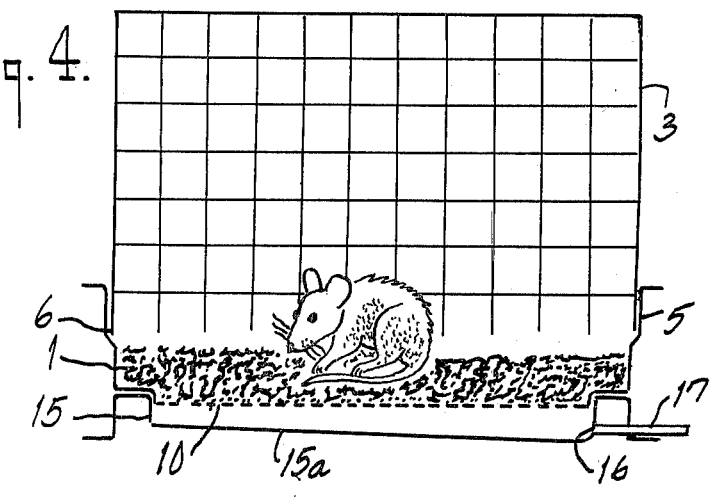
FIG. 4 is a sectional view of a laboratory animal cage provided with a toilet and drain according to the invention.

FIG. 4 shows how the waste receptacle according to the invention may be used in conjunction with containers or cages for laboratory animals, such as mice and rats. In a sectional view, wire walls 3 for a laboratory animal are attached to or fitted to perimeter or wall 6 of foraminous tray 5, foraminous tray 5 forming flooring for the cage. Hydrophobic granular material 1 is disposed in foraminous tray 5. Employing hydrophobic granular material of approximately 0.12 inch to approximately 0.25 inch in diameter, the layer of hydrophobic material 1 in tray 5 would be about 1.25 inches to about 1.75 inches deep. Wire walls 3 and foraminous tray 5 are mounted on collecting tray 15. Preferably, collecting tray 15 is fitted with drain 16 to external waste line 17. To facilitate efficient disposal of liqiud waste into drain 16 and waste line 17, bottom 5a of collecting tray 15 preferably gently slopes towards drain 15 and waste line 17.

Figure 5:
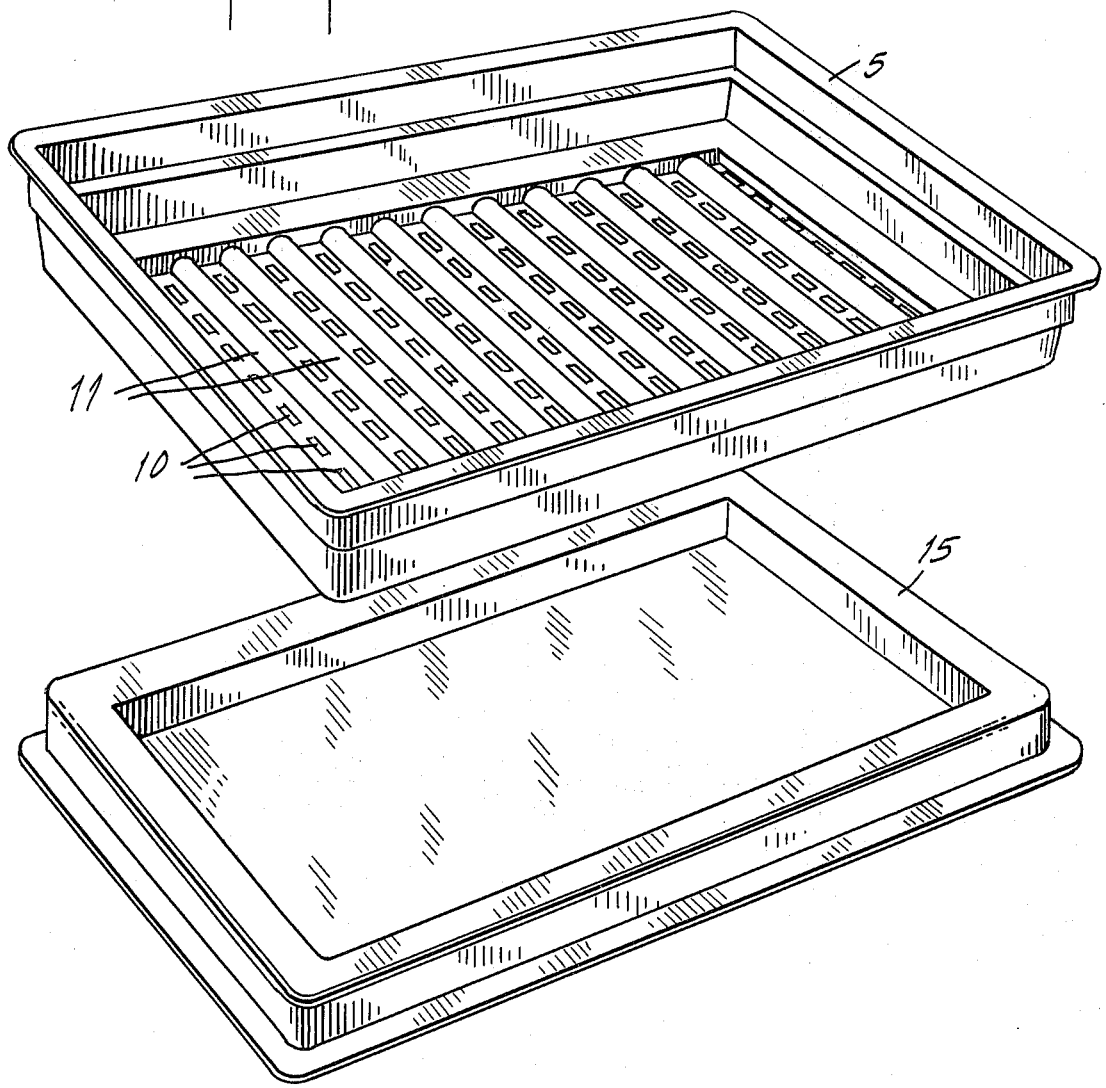
FIG. 5 is an exploded view of the household pet toilet of FIG. 1 showing components other than the layer of non-absorbent, granular material comprising the odor barrier according to the invention.

FIG. 5 shows an exploded view of the household pet waste receptacle shown in FIG. 1, without a layer of hydrophobic granular material. Foraminous tray 5 has openings 10 and elevations 11 adjacent openings 10. Collecting tray 15, on which foraminous tray 5 will be mounted, is also shown.

Figure 6:
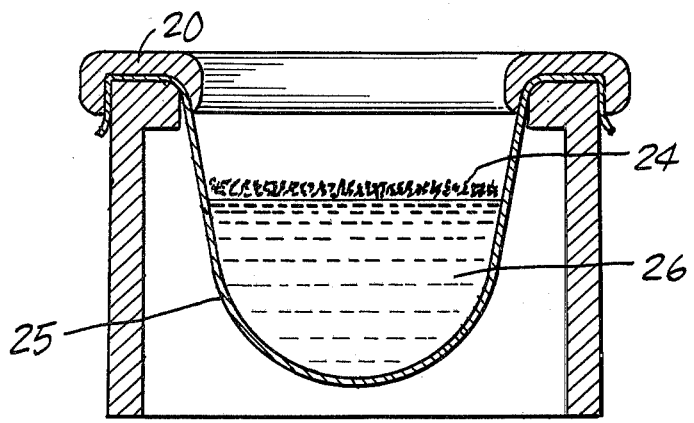
FIG. 6 is a sectional view of a portable toilet for human use according to the invention.

FIG. 6 shows a portable toilet fitted with an odor barrier according to the invention. Portable toilet 20 has receptacle 25, which may be a plastic bag, in which water 26, which may contain deodorants or disinfectants, is contained. According to the invention, a layer of hydrophobic, buoyant, granular material 24 is also contained in receptacle 25. Excrement will pass through hydrophobic, buoyant, granular material 24 into waste 26. Hydrophobic, buoyant, granular material 24 prevents offensive odors from escaping from excrement-containing water 26. For hydrophobic, buoyant, granular material 24 approximately 0.12 inch to approximately 0.25 inch in diameter, the floating layer of such material in the portable toilet receptacle 25 would be about 1.25 inches to about 1.75 inches thick.

Although emphasis has been placed in the accompanying disclosure of the practices of this invention on the utilization of the non-absorbent, hydrophobic, non-water-wettable granular material as animal litter in cages for laboratory animals, such as mice and rats, and also as a litter for use in connection with cat litter boxes, the hydrophobic granular material of this invention is also useful in commercial, industrial and municipal installations to provide a buoyant odor barrier coating on liquid waste materials or effluents which yield or produce or generate offensive noxious odors. In food processing plants, such as slaughter houses, in grain and dairy products processing installations, in chemical plants, and in paper manufacturing installations, aqueous liquid waste effluents are produced and must be discarded. In connection with such plant installations, ponds or sumps or areas containing such offensive waste materials for storage and the like are employed.

When such ponds or containment vessels or areas are open to the air or uncovered, offensive odors from such places are released to the atmosphere. Such odors so released are not only esthetically offensive to the surrounding population, but also might present a health problem.

The release of such odors in accordance with the practices of this invention is substantially reduced by providing a heavy coat or layer of the granular material as a buoyant layer on top of such open areas or containment vessels. In such large-scale application of the practices of this invention, the layer of granular material might be of substantial thickness from 1 or 2 inches in depth to as much as 6 inches in depth, more or less. The buoyant coating of granular material of such thickness would effectively prevent the escape of offensive or noxious fumes from substantially any open storage or containment vessel or pond or area. From time to time, the buoyant layer of granular materials could be washed for cleaning purposes and to remove any surface-clinging solid materials, such as by hosing down with water, or partially or completely replenished from time to time as may be required. Any such granular material so removed could be readily disposed of, such as by burning if the granular material is organic, or as landfill if the granular material is inorganic.

As will be apparent to those skilled in the art, many substitutions, alterations and modifications are possible in accordance with the practices of this invention without departing from the spirit or scope thereof.

What is claimed is:

1. A device for receiving small animal waste comprising
   (a) a foraminous tray;
   (b) means vertically attached or fitted about the perimeter of said foraminous tray;
   (c) a layer of substantially non-absorbent buoyant hydrophobic, non-water wettable granular material substantially uniformly dispersed on the tray to form an odor barrier, said hydrophobic, non-water wettable granular material consisting of buoyant granular material treated with a hydrophobic, non-water wettable substance, such as paraffin wax, so as to coat said granular material, to provide said granular material with a hydrophobic, non-water wettable coating thereon, said granular material being of sufficient size to be retained on the tray, and
   (d) collecting means positioned beneath and supporting the tray for receiving liquid waste material deposited in said granular material.

2. A device for receiving small-animal waste as recited in claim 1 further comprising absorbent material disposed within the collecting means.

3. A device for receiving small-animal waste as recited in claim 1 further comprising a drain opening provided in said collecting means.

4. A device for receiving small-animal waste as recited in claim 1 wherein the substantially non-absorbent, hydrophobic granular material is paraffin wax coated corn cob granules.

5. A device in accordance with claim 4 wherein said paraffin wax coated corn cob granules have a particle size in the range from about 0.12 to about 0.25 inch.

6. In a human chemical toilet having a waste receiving receptacle and liquid material disposed therein to receive solid waste material, the improvement which comprises a buoyant layer of substantially non-absorbent buoyant hydrophobic granular material substantially uniformly disposed on the surface of said liquid material said hydrophobic non-water wettable granular material consisting of buoyant granular material treated with a hydrophobic, non-water wettable substance such as paraffin wax, so as to coat said granular material to provide said granular material with a hydrophobic, non-water wettable coating thereon, to form an odor barrier therein with respect to said solid waste material deposited within said liquid material.

7. Hydrophobic, non-water wettable granular material, said granular material comprising buoyant granular material treated with a hydrophobic, non-water wettable substance, such as paraffin wax, so as to coat said granular material, to provide said granular material with a hydrophobic, non-water wettable coating thereon, said hydrophobic, non-water wettable granular material being useful as an odor barrier when disposed as a layer on odoriferous liquid material.

8. Non-absorbent granular material as recited in claim 7 wherein said granular material comprises corn cob granules coated with a layer of hydrophobic material.

9. Non-absorbent granular material as recited in claim 8 wherein said corn cob granules are coated with a layer of wax.

10. A method of preparing non-absorbent granular material for use in waste receptacles for animals comprising the steps of:
    (a) tumbling corn cob granules and paraffin wax chips until the corn cob granules are uniformly coated with wax; and
    (b) tumbling and coating the resulting wax coated corn cob granules until the coated granules are tack free.

11. A method of containing or inhibiting the release of odor from an odoriferous liquid-containing body or pool which comprises providing or disposing on the surface of said liquid body or pool a buoyant layer of substantially non-absorbent, substantially hydrophobic or non-water-wettable granular material, said hydrophobic, non-water wettable granular material consisting of buoyant granular material treated with a hydrophobic, non-water wettable substance, such as paraffin wax, so as to coat said granular material to provide said granular material with a hydrophobic, non-water wettable coating thereon.

12. A method in accordance with claim 11 wherein said buoyant layer of granular material has a thickness in the range of up to about 6 inches.

13. A method in accordance with claim 11 wherein said buoyant layer of granular material comprises inorganic material.

14. A method in accordance with claim 11 wherein said buoyant layer of granular material comprises organic material.

15. A method in accordance with claim 11 wherein said buoyant layer of granular material comprises corn cob granules.

16. A method in accordance with claim 15 wherein said corn cob granular material has a particle size in the range of about 0.06 inch to about 0.4 inch.

17. A method in accordance with claim 11 wherein said odoriferous liquid-containing body or pool comprises effluent from a paper mill.

18. A method in accordance with claim 11 wherein said odoriferous liquid-containing body or pool comprises effluent from a food processing operation.

19. A method in accordance with claim 11 wherein said odoriferous liquid-containing body or pool comprises effluent from a meat and/or fish and/or poultry processing operation.

20. A method in accordance with claim 11 wherein said odoriferous liquid-containing body or pool comprises effluent from a chemical manufacturing operation.

21. A method in accordance with claim 11 wherein said odoriferous liquid-containing body or pool comprises effluent from a petroleum refining or processing operation.

22. A method of preparing non-absorbent non-water-wettable granule material which comprises contacting granular material with a hydrophobic agent so as to produce a substantially non-water-wettable coating on said granular material, said hydrophobic agent being a non-water wettable substance, such as paraffin wax.

23. A method in accordance with claim 22 wherein said agent is a liquid or dissolved wax.

* * * * *